Figure 1:
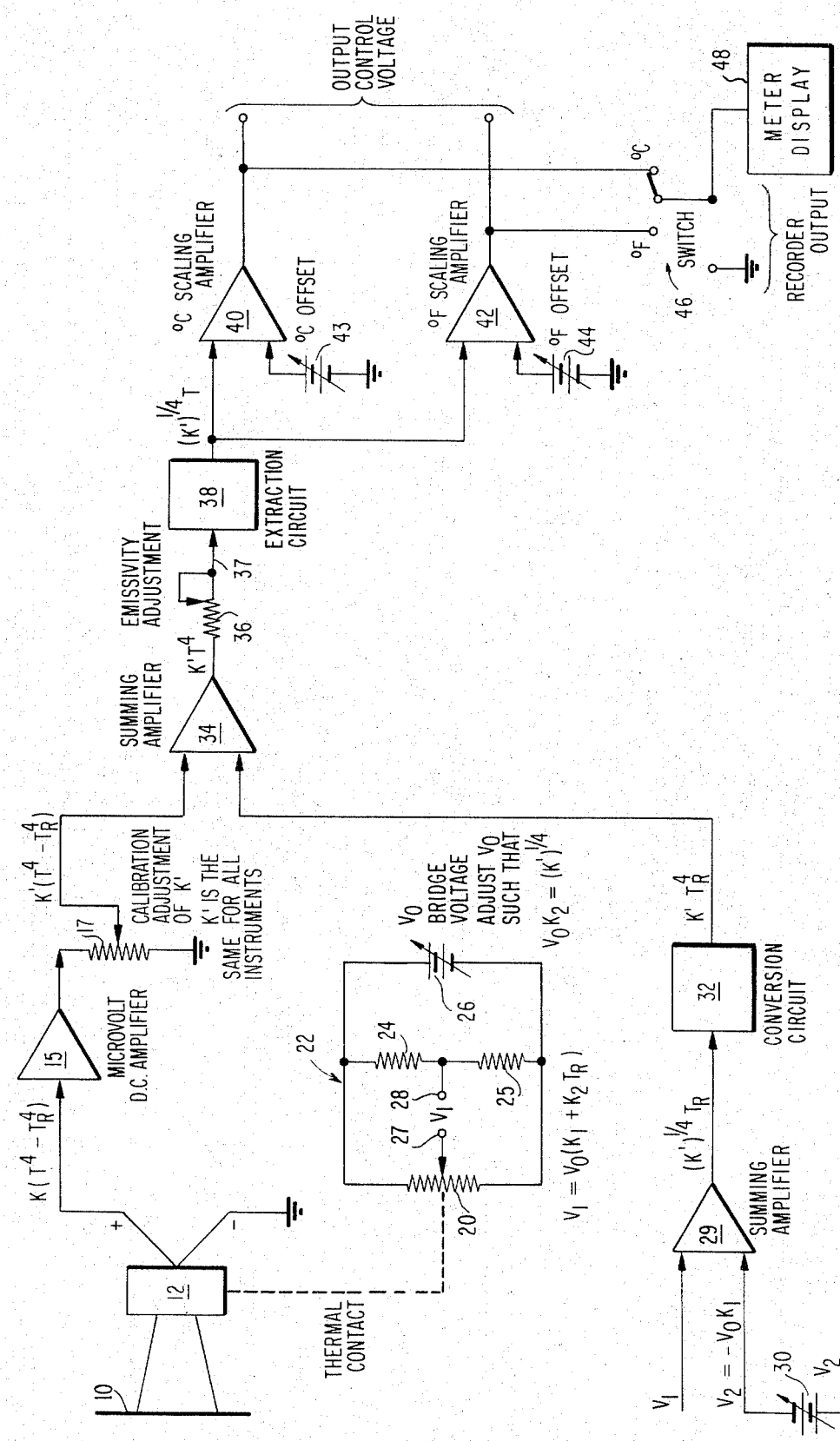

United States Patent [19]

Risgin et al.

[11] 3,777,568
[45] Dec. 11, 1973

[54] D. C. ELECTRONIC APPARATUS FOR IR RADIATION TEMPERATURE MEASUREMENT

[75] Inventors: Ojars Risgin, Grass Lake; Donald M. Szeles, Ann Arbor, both of Mich.

[73] Assignee: Sensors, Inc., Ann Arbor, Mich.

[22] Filed: Dec. 21, 1971

[21] Appl. No.: 210,463

[52] U.S. Cl........ 73/355 EM, 235/151.3, 235/193.5
[51] Int. Cl............................ G01j 5/10, G06g 7/20
[58] Field of Search.................. 73/355 EM, 355 R; 235/151.3, 193.5

[56] References Cited
UNITED STATES PATENTS

| | | | |
|---|---|---|---|
| 3,696,678 | 10/1972 | Mossey | 73/355 R X |
| 3,698,813 | 10/1972 | Aisenberg | 73/355 R X |
| 2,696,117 | 12/1954 | Harrison | 73/355 R |
| 3,444,739 | 5/1969 | Treharne | 73/355 R |

Primary Examiner—Richard C. Queisser
Assistant Examiner—Frederick Shoon
Attorney—Raymond N. Baker

[57] ABSTRACT

Rapid response, high accuracy, D.C. electronic device for non-contact temperature measurement relying on infrared radiation viewed without use of cyclic interruption of radiation, any type of sequential operation or moving parts and without relying on any type of reference temperature maintenance. A temperature responsive radiation intensity signal ($T^4_{(abs)} - T^4_{R(abs)}$) is produced and algebraically combined electronically with an independently sensed reference temperature ($T_R$) raised to the fourth power ($T^4_{R(abs)}$) to produce an output signal ($T^4_{abs}$) functionally related to object temperature. Extracting the fourth root electronically a signal ($T_{abs}$) is produced which is in linear relation to the absolute temperature of the body. Circuit means provide for conversion to Fahrenheit or Centigrade temperature indications for direct reading, recording, or process control.

15 Claims, 6 Drawing Figures

D. C. ELECTRONIC APPARATUS FOR IR RADIATION TEMPERATURE MEASUREMENT

This invention is concerned with D.C. infrared radiometry, in particular, with novel concepts in non-contact radiation temperature measurement.

Most prior art radiation pyrometric devices rely on cyclic interruption of radiation such as the device shown in U.S. Pat. No. 2,761,072. For various reasons it has been felt to be necessary to use a mechanical chopper to interrupt radiation impingement on the detector and operate with AC electrical apparatus or sequential operation apparatus as shown in U.S. Pat. No. 3,609,365. The present invention is purely electronic, utilizing no moving parts, is inherently rugged to permit use in severe environments, and provides high sensitivity and accuracy while requiring no special operator training or skill.

An important contributing factor to the accuracy and wide temperature range reliability of the present invention stems in part from use of precision thermal sensing means to sense the reference temperature at the radiation detector and electronically maintain a continuous correction for ambient temperature at the radiation detector.

Because of the inventive concepts involved, DC electronic apparatus directly provides accurate radiation temperature measurement with no requirement for separate computer functions. Such apparatus is capable of producing an accurate electrical output which is in linear relationship to the object temperature being measured so that direct digital reading can be provided or the output can be used directly in process control.

Further, accurate temperature readings can be provided over a wide temperature range with the same device, without switching scales or making special compensating computations or the like. For example, over a range of 1,000° F. or more, accuracy of 1° F., or plus or minus 1 percent of the reading, whichever is greater is provided. Such flat response accuracy over a wide temperature range was not available in prior commercial pyrometers. In general, prior commercial devices have been limited to a range of several hundred degrees Fahrenheit with accuracies varying as much as plus or minus 10 percent of the temperature measurement because of inherent limitations of prior art IR radiometric apparatus. The high sensitivity of the IR radiometer of the present invention permits temperature measurement in the difficult range from below minus 100° F. to above 1,000° F. with an accuracy of ±1 percent of the reading notwithstanding ambient temperature changes at the radiation detector in excess of 100° F.

An important contribution of the invention involves working directly with the fourth power of the radiator temperatures under consideration. In the inventive method, an electrical signal directly responsive to the difference between the fourth powers of the object temperature and the reference temperature at the radiation detector $[T^4_{(abs)} - T^4_{R(abs)}]$ is produced. The reference temperature is sensed independently, converted, and electronically combined with the radiation intensity measurement so as to produce an accurate measurement of object temperature. One advantageous result is rapid response times of 0.5 second or less.

Figures 2, 3, 4, 5, 6:
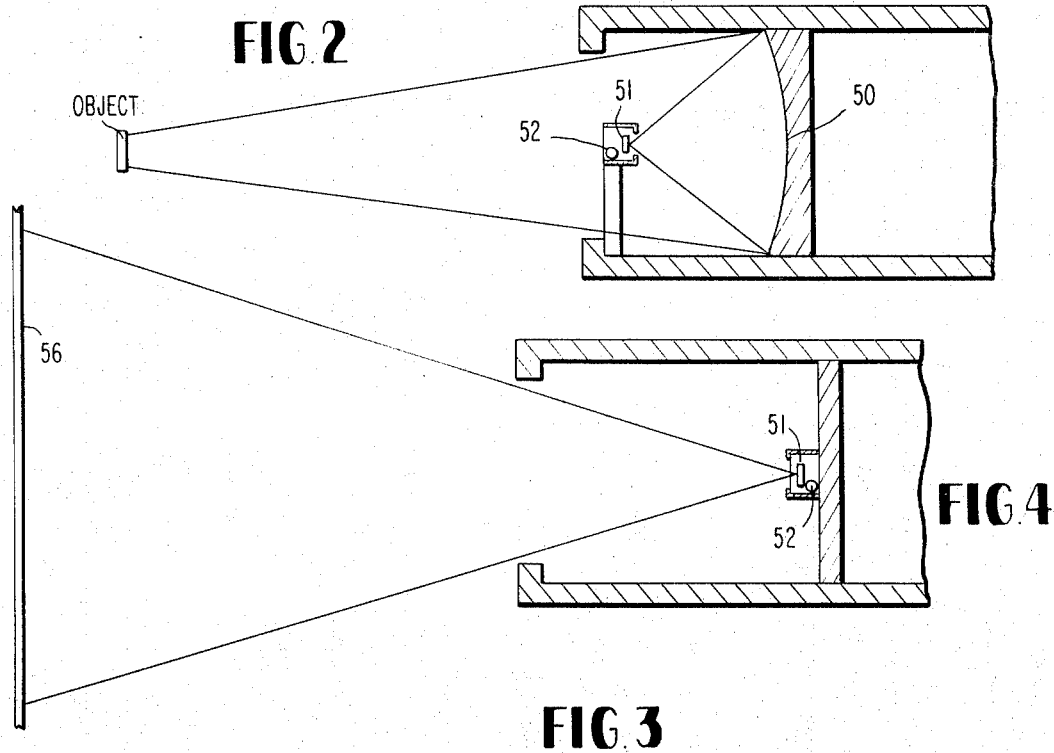

Other advantages and features of the invention will be considered in disclosing a specific embodiment of the invention as shown in the figures briefly described below:

FIG. 1 is a schematic diagram of DC electronic temperature measuring apparatus embodying the invention, FIGS. 2–4 are schematic illustrations of optical apparatus forming part of the invention, FIG. 5 is an exploded view in elevation of radiation sensing head structure embodying the invention, and FIG. 6 is a perspective view of a radiation temperature measurement device embodying the invention.

A wide spectral range radiation detector is used to sense IR radiation. For example, a thermopile detector can be used to directly generate a signal responsive to radiation intensity. The electrical signal from such radiation detector when sensing a "black body" radiator will be accurately resonsive to $T^4_{(abs)} - T^4_{R(abs)}$ where T is the object temperature in degrees absolute and $T_R$ is the reference temperature at the radiation detector in degrees absolute. For example, when the object temperature and the detector temperature are identical, there will be a zero output. The invention also provides for electronic compensation when less than black-body radiation characteristics are encountered.

Concurrent with radiation intensity measurement, thermosensing means are independently measuring the reference temperature at the radiation detector. With proper conversion and scaling these radiation intensity and reference temperature signals are algebraically combined electronically to produce an electrical signal which is accurately related to object temperature so as to be capable of providing direct temperature readings.

As part of the inventive concept, the independent reference temperature measurement is converted to the fourth power for electronic algebraic combination with the radiation intensity signal. The resultant fourth power of the object temperature thus obtained is an accurate radiation temperature representation and is used to electronically obtain a signal directly proportional to the absolute temperature of the object.

A practical embodiment of the D.C. electronic apparatus of the invention is shown in the schematic of FIG. 1 which will be used to describe in more detail the inventive concepts involved. Infrared radiations from an object 10, whose temperature is to be measured, are directed toward radiation detector 12. The infrared radiation of the object is dependent on the temperature of the body 10 and is effected by the surface characteristics (emissivity factor) of such body.

Radiation detector 12 produces a signal, responsive to such IR radiation having a value corresponding to K $[T^4_{(abs)} - T^4_{R(abs)}]$ where the constant "K" takes into account detector and radiator emissivity characteristics, T is the actual temperature of the body in degrees absolute, and $T_R$ is the temperature at the radiation detector in degrees absolute. This signal is directed through connector 14 to a DC microvolt amplifier 15 of suitable gain (about 250), low noise and stability characteristics.

Where standardization for production is required, the radiation detector 12 can be calibrated at resistor 14 to produce a signal K' $[T_{(abs)}^4 - T_{R(abs)}^4]$ such that the instrument constant K' is the same for all radiation detectors and further permits the radiation intensity measurement to be combined electronically with the independent reference temperature measurement.

During radiation intensity measurement, a thermal sensing means, including thermal sensing element 20 and associated balanceable network 22, independently and continuously measure the reference temperature ($T_{R(abs)}$) at radiation detector 12 to produce an electrical signal responsive to such reference temperature measurement. Thermal sensing element 20 is positioned in good thermal contact with radiation detector 12 and, is included in one balanceable path of, for example, a bridge circuit while resistors 24 and 25 are located in the remaining balanceable path. The bridge circuit is supplied from an adjustable voltage source 26 which enables introduction of the instrumentation constant K' to permit electronic summing with the radiation detector signal; as introduced at the bridge circuit this factor is the fourth root of the instrumentation constant $(K')^{1/4}$.

The voltage output ($V_1$) from the bridge circuit is removed at terminals 27, 28 and directed to summing amplifier 29. That portion of the voltage output ($V_1$) due to the bridge circuit resistance is removed by a voltage input to the summing amplifier 29 supplied from voltage source 30.

The electrical signal from summing amplifier 29 is equal to $(K')^{1/4}T_R$. This signal is electronically raised to the fourth degree in the exponential conversion circuit 32 to produce a signal equal to $K'T_R^4$.

This electronic conversation of the reference temperature measurement to the fourth degree can be carried out with a number of electronic circuits which are known, independent of the present invention, to those skilled in the electronics art. For example, conversion to the fourth power can be carried out with two squaring circuits connected in series, or a diode function generator, or a log-antilog circuit. Also, where the range of reference temperature variation is limited the thermal detector bridge voltage and the bridge resistance characteristics can be chosen to provide a linear approximation which is a sufficiently accurate signal representation of the fourth power of the reference temperature ($T_R^4$). It has been found, for example, that over a range of 0° to 50° C. the error from such a linear approximation approach is less than 1 percent; since a 1 percent error in the signal of the fourth degree of the reference temperature results in a substantially lower error in final temperature (fourth root) reading, this approach is sufficiently accurate for most commercial applications.

In accordance with the invention, the electrical signal responsive to the difference in the fourth powers of the object temperature and the reference temperature is combined with the independently measured reference temperature signal raised to the fourth power. This is carried out in summing amplifier 34 which combines the electrical signal having its source in the radiation detector 12 $[K'(T^4_{(abs)} - T_{R(abs)}^4)]$, with the electrical signal having its source in the thermal sensing element 20 ($K'T_R^4$). The output of summing amplifier 34 is then directly responsive to the fourth power of the object temperature ($K'T^4$).

When measuring the temperature of other than a black body radiator, i.e. a body having an emissivity factor less than 1 an emissivity adjustment is made. This can be effectively carried out by resistor 36. If the emissivity is less than 1 resistor 36 is adjusted to increase the gain of the amplifier. When temperature measurements of known materials are to be made, the emissivity factor can be found in a handbook. Otherwise, emissivity factor calibrations can be made from contact temperature measurements.

The electrical signal established in connector 37 is functionally related to the temperature of the body and is directed to root extraction circuit means 38. Circuits for taking the fourth root of this electrical signal can be of the same general classification of known circuits mentioned earlier in relation to the exponential circuitry, such as a log anti-log circuit, a diode function generator, or two square root circuits in series; such circuits are connected to perform the inverse operation, i.e. obtaining the fourth root.

The output electrical signal responsive to the absolute temperature $[(K')^{1/4}T]$ is converted to a more commonly-used temperature scale, Centigrade or Fahrenheit, in scaling amplifier 40 for Centigrade and scaling amplifier 42 for Fahrenheit. An offset voltage input from source 43 is provided for the Centigrade readings and an offset voltage input from source 44 is provided for the Fahrenheit readings, respectively, to compensate electronically for the zero point shifts in the respective scales. The absolute temperature signal and the Fahrenheit or Centigrade temperature signals are in linear relationship to the temperature of the object and can be used for direct digital temperature reading, can be recorded, or can be used directly in process control.

As shown in FIG. 1, the signal from the Centigrade or Fahrenheit scaling amplifiers, 40 and 42, is directed to switch means 46 which permits selection of the temperature scale reading and also provide an option for recording or process control. Direct digital display is provided through digital meter 48.

FIGS. 2–4 show, schematically, optics for directing radiations from an object to the radiation detector. In FIG. 2, mirror 50 directs radiation to radiation detector 51. Thermal sensor 52 is in thermal contact with the radiation detector 51. In FIg. 3 IR lens 54 focuses radiation on the detector. In FIG. 4 radiation focusing means are omitted to permit observation of an extended surface of object 56. Detector supports are of metal to provide good thermal contact with the case of the detector head.

In the sensing head structure of FIG. 5, outer case 60 is shown removed from pin header 61. Window 62 directs radiation toward radiation detector 63. Radiation detector 63 is mounted on metal support structure 64 to provide good thermal contact with thermal sensing structure 65.

As shown in FIG. 6, sensing head structur 68 is connected by lead 69 to circuit housing and display structure 70. The sensing head includes a window 71 and focusing gauge 72. The latter readily establishes the correct focal distances when using a focusing lens or mirror. The display unit includes digital panel 73, selector 74 for recording, selector 75 for Fahrenheit or Centigrade scales, on-off switch 76, and emissivity adjustment control 77.

The radiation detector 12 of FIG. 1 is preferably a thermopile of the type described in copending Patent application Ser. No. 120,377, filed 3/2/71, and supplied by Sensors, Inc., Ann Arbor, Mich. The thermal sensing element 20 can take the form of a thermistor such as YSI No. 44201 supplied by Yellow Springs Instrument Co., Yellow Springs, Ohio, connected in a known type of thermistor bridge network to produce an output voltage linear with reference temperature.

The amplifiers can be of the high performance operational type such as Model µA741 supplied by the Fairchild Semiconductor Division of Fairchild Camera and Instrument Corporation, Mountain View, Calif. A typical unit for carrying out the fourth power conversion and fourth root extraction functions comprises the Philbrick Model 4452, supplied by Teledyne Philbrick, Dedham, Mass.

Other circuit components for carrying out the novel concepts of the invention will be obvious to those skilled in the art from the above disclosure so that that reference should be had to the accompanying claims in determining the scope of the present invention.

It is claimed:

1. D.C. electronic temperature-measurement apparatus for non-contact determination of object temperature responsive to infrared radiation from such object, comprising
   radiation detector means sensitive to infrared radiation from such object to produce an electrical signal responsive to $$T^4_{(abs)} - T_R^4{}_{(abs)}$$

where T is the temperature in degrees absolute of such object and $T_R$ is the reference temperature in degrees absolute at the radiation detector means,
   thermal sensing means for independently measuring the reference temperature at the radiation detector means to produce an electrical signal responsive to such reference temperature,
   conversion circuit means for converting the electrical signal produced by the thermal sensing means to an electrical signal representative of the fourth power of such reference temperature in degrees absolute $(T_R^4{}_{(abs)})$, and
   circuit means for algebraically combining the electrical signals representative of $(T^4_{(abs)} - T_R^4{}_{(abs)})$ and $T_R^4{}_{(abs)}$ to produce an electrical signal indicative of the temperature of such object, such circuit means including summation circuit means which produce an electrical signal output representative of the fourth power of the temperature of such object in degrees absolute, and further including
   root extraction circuit means for converting the electrical signal rrpresentative of the fourth power of the temperature of such object in degrees absolute to an electrical signal which is in linear relationship to the temperature of such object.

2. The apparatus of claim 1 in which the electrical signal from the root extraction circuit means is representative of the temperature of such object in degrees absolute, and further including
   scaling circuit means electrically connected to the root extraction circuit means to produce an electrical output in linear relationship to the temperature of the object in a commonly used temperature scale, such as Fahrenheit and Centigrade temperature scales.

3. The apparatus of claim 2 including
   digital display means electrically connected to the scaling circuit means for direct numerical display of the temperature of such object.

4. The apparatus of claim 1 in which the radiation detector means comprises
   thermocouple means including hot junction means for receiving infrared radiation from such object and cold junction means shielded from such infrared radiation so as to generate the electrical signal responsive to $$T^4_{(abs)} - T_R^4{}_{(abs)}.$$

5. The apparatus of claim 1 in which the thermal sensing means includes a thermal sensing element and associated circuitry for producing the electrical signal responsive to the reference temperature.

6. The apparatus of claim 5 in which the radiation detector means comprises
   thermocouple means including hot junction means for receiving infrared radiation from such object and cold junction means shielded from said such infrared radiation, and in which
   the thermal sensing element is in thermal contact with such cold junction means.

7. The apparatus of claim 6 in which the thermal sensing element comprises thermistor means.

8. The apparatus of claim 7 in which the associated circuitry comprises
   electrically balanceable network means with the thermistor means connected in one balanceable path of balanceable network means, and
   a voltage source connected across the electrical balanceable network means so as to produce a voltage output responsive to the reference temperature.

9. The apparatus of claim 8 including
   voltage adjustment means for generating a voltage input for removing that portion of the voltage output due to resistance of the balanceable network means, and
   summing amplifier means for combining the voltage output of the balanceable network means and the voltage input of the voltage adjustment means to produce a voltage signal in linear relationship to the reference temperature.

10. The apparatus of claim 9 including
    exponential circuit means for converting the voltage signal in linear relationship to the reference temperature into an electrical signal representative of the fourth power of such reference temperature $[T_R^4{}_{(abs)}]$.

11. The apparatus of claim 1 including
    emissivity calibration means for adjusting the electrical signal indicative of the temperature of the object for infrared radiation characteristics of such object.

12. The D.C. radiation temperature measurement apparatus of claim 1 further including
    viewing means, in spaced relationship from an object the temperature of which is to be measured, for receiving modulation-free radiation direct from such object.

13. The device of claim 12 in which the viewing means include housing means with window means for directing infrared radiation from such object to the radiation detector means,
    the housing means including metal support structure for providing thermal contact between the radiation detector means and the thermal sensing means.

14. The device of claim 13 including
    optic means for focusing infrared radiation on the radiation detector means.

15. The device of claim 14 including
    focusing gauge means mounted on the housing means for positioning the radiation detector means at optimum focal distance from such object.

* * * * *